United States Patent
Choi

(10) Patent No.: US 9,705,444 B2
(45) Date of Patent: Jul. 11, 2017

(54) DEVICE AND METHOD FOR CONTROLLING ELECTRIC MOTOR ACCORDING TO SENSED OFFSET CURRENT VALUES

(71) Applicant: LSIS CO., LTD., Anyang-si, Gyeonggi-do (KR)

(72) Inventor: Gi Young Choi, Seongnam-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/597,078

(22) Filed: Jan. 14, 2015

(65) Prior Publication Data
US 2015/0214881 A1    Jul. 30, 2015

(30) Foreign Application Priority Data
Jan. 24, 2014   (KR) .................. 10-2014-0008994

(51) Int. Cl.
| | | |
|---|---|---|
| H02P 6/14 | (2016.01) | |
| H02P 27/06 | (2006.01) | |
| H02P 6/10 | (2006.01) | |
| H02P 21/22 | (2016.01) | |
| H02P 6/08 | (2016.01) | |
| H02P 31/00 | (2006.01) | |

(52) U.S. Cl.
CPC ............ *H02P 27/06* (2013.01); *H02P 6/10* (2013.01); *H02P 21/22* (2016.02); *H02P 6/08* (2013.01); *H02P 6/14* (2013.01); *H02P 31/00* (2013.01); *H02P 2205/01* (2013.01)

(58) Field of Classification Search
CPC .... H02P 6/14; H02P 6/08; H02P 6/001; H02P 27/06; H02P 21/0035; H02K 29/00; H02K 29/08

USPC ..................................................... 318/400.26
See application file for complete search history.

(56) References Cited

U.S. PATENT DOCUMENTS

| | | |
|---|---|---|
| 4,576,253 A | 3/1986 | Tanahashi et al. |
| 2011/0074329 A1* | 3/2011 | Matsushita ....... H02M 7/53873 318/503 |

(Continued)

FOREIGN PATENT DOCUMENTS

| | | |
|---|---|---|
| CN | 102868341 | 1/2013 |
| CN | 103166567 | 6/2013 |

(Continued)

OTHER PUBLICATIONS

European Patent Office Application Serial No. 15151411.4, Search Report dated Jul. 7, 2015, 7 pages.

(Continued)

*Primary Examiner* — Kawing Chan
*Assistant Examiner* — Bradley Brown
(74) *Attorney, Agent, or Firm* — Lee, Hong, Degerman, Kang & Waimey

(57) ABSTRACT

A device for controlling an electric motor is provided. The device includes: an inverter supplying a current to an electric motor; a current sensor sensing a current supplied from the inverter to the electric motor; and a control unit enabling the current to be supplied from the inverter to the electric motor, obtaining first and second offset values sensed from the current sensor at a plurality of times, comparing the plurality of offset values obtained, and updating the first offset value to the second offset value according to a result of comparing the offset values.

10 Claims, 3 Drawing Sheets

(56) References Cited

U.S. PATENT DOCUMENTS

| | | | |
|---|---|---|---|
| 2013/0090811 A1* | 4/2013 | Maehara | B62D 6/008 |
| | | | 701/41 |
| 2013/0154526 A1 | 6/2013 | Choi | |
| 2014/0091743 A1* | 4/2014 | Suzuki | H02P 29/027 |
| | | | 318/400.22 |

FOREIGN PATENT DOCUMENTS

| | | |
|---|---|---|
| DE | 3942167 | 6/1990 |
| EP | 2607914 | 6/2013 |
| JP | 8-47280 | 2/1996 |
| JP | 11-217080 | 8/1999 |
| JP | 2001-186784 | 7/2001 |
| JP | 2012-182920 | 9/2012 |
| JP | 2013-128403 | 6/2013 |

OTHER PUBLICATIONS

Japan Patent Office Application Serial No. 2015-011282, Office Action dated Feb. 23, 2016, 3 pages.
The State Intellectual Property Office of the People's Republic of China Application No. 201510081801.X, Office Action dated Jul. 29, 2016, 8 pages.
Japan Patent Office Application Serial No. 2015-011282, Notice of Allowance dated Sep. 13, 2016, 3 pages.

* cited by examiner

DEVICE AND METHOD FOR CONTROLLING ELECTRIC MOTOR ACCORDING TO SENSED OFFSET CURRENT VALUES

CROSS-REFERENCE TO RELATED APPLICATIONS

Pursuant to 35 U.S.C. §119(a), this application claims the benefit of earlier filing date and right of priority to Korean Patent Application No. 10-2014-0008994, filed on Jan. 24, 2014, the contents of which are hereby incorporated by reference herein in its entirety.

BACKGROUND

The present disclosure relates to a device and method for controlling an electric motor.

In general, a hydraulic power steering apparatus using the oil pressure of a hydraulic pump or an electronic power steering apparatus (EPS) using an electric motor is being used in the car.

The hydraulic power steering apparatus always consumes energy irrespective of the rotation of a steering wheel because the hydraulic pump being a power source assisting in power is driven by an engine.

However, in the case of the EPS, the electric motor driven with electrical energy provides steering assisting power when the steering wheel rotates and thus torque occurs.

Thus, when the EPS is used, it is possible to enhance energy efficiency in comparison to the hydraulic power steering apparatus.

The EPS uses generated torque, a vehicle speed, or a steering angle to recognize the steering intention of a driver and the operating station of a vehicle, generates steering assisting power by considering them, and then transmits the power to a steering column, rack bar, rack and pinion so that the driver may drive more safely.

The EPS may be controlled by an electronic control unit (ECU).

The ECU checks a current flowing in the electric motor in order to precisely control the electric motor driven by a steering apparatus and calculates a torque generated at the electric motor and a ripple due to the torque, namely, torque ripple. The torque ripple is generated by an error in path through which a current detected by a current sensor flows, an error in voltage applied to the current sensor, or the DC offset of the current sensor itself and due to this, there is a limitation in that the control performance of the electric motor decreases.

The DC offset is a small amount of DC current for operating the current sensor. In order for the current sensor to measure a current flowing in the electric motor, a small amount of current for operating the current sensor is needed. A current output by the current sensor is a sum of a current flowing in the electric motor to be actually found and a small amount of current needed for operating the current sensor. In this case, the value of a current flowing actually in the electric motor to be measured is distorted due to the small amount of current.

FIG. 1 is a flowchart showing how a typical electric motor control device applies a DC offset.

Referring to FIG. 1, the ECU for operating the electric motor is initialized in step S10 and the current sensor measures a current offset value flowing in each phase in step S20.

When the measuring of the current offset value is completed, the current offset value is applied so that the operation mode of the ECU for operating the electric motor is executed in step S30. The application of PWM, namely, the operation state of the electric motor is consistently is checked during the operation of the ECU and when the electric motor is not in the operation state, a pre-measured offset value is re-measured. Also, the electric motor continues to operate according to the driving mode of the ECU irrespective of the change of the offset value in step S50.

Thus, it is difficult for the ECU to measure a new offset value while the electric motor continues to operate, and even after an offset value changes, the ECU does not perform a compensation operation with a new offset value. Thus, while the ECU controls the electric motor, it continues to operate the electric motor without compensating for an offset.

SUMMARY

Embodiments provide a device and method for controlling an electric motor that sense an offset of a current applied to an electric motor and perform corresponding compensation.

In one embodiment, a device for controlling an electric motor includes: an inverter supplying a current to an electric motor; a current sensor sensing a current supplied from the inverter to the electric motor; and a control unit enabling the current to be supplied from the inverter to the electric motor, obtaining first and second offset values sensed from the current sensor at a plurality of times, comparing the plurality of offset values obtained, and updating the first offset value to the second offset value according to a result of comparing the offset values.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 2:
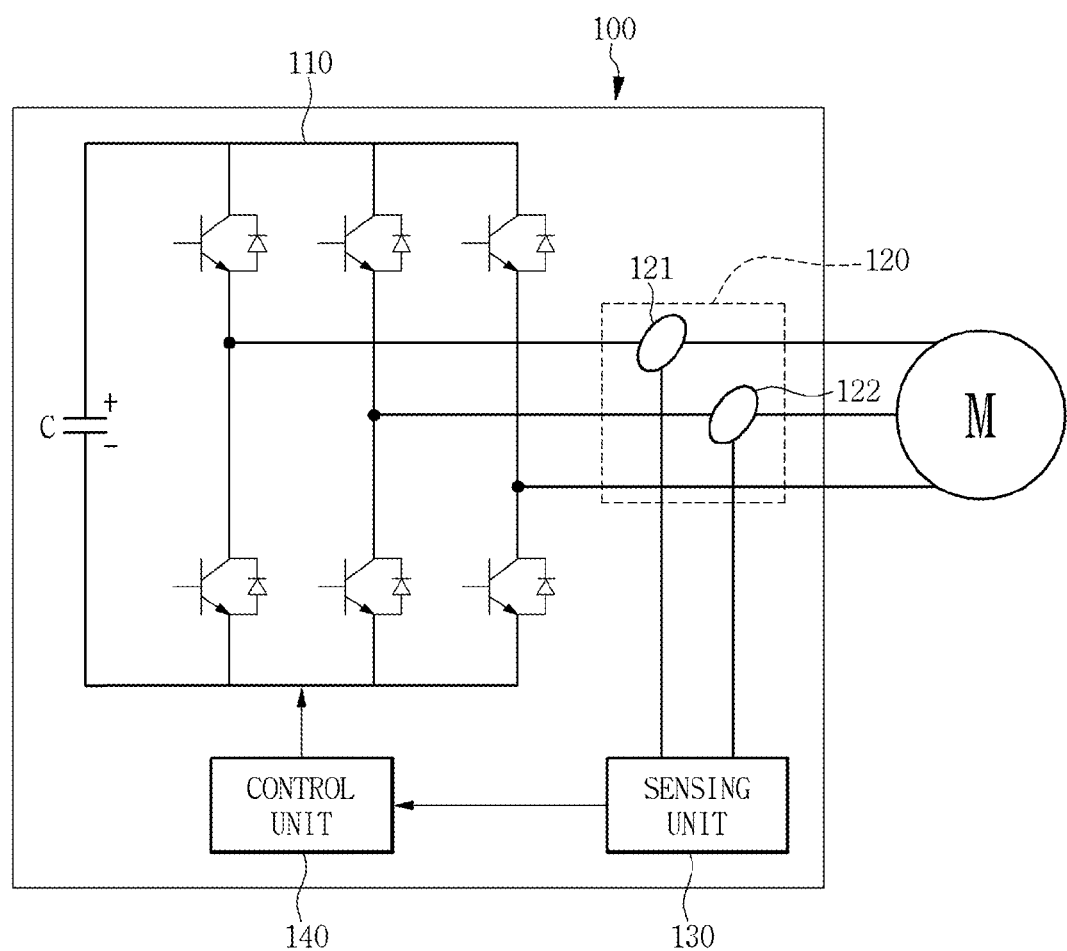
FIG. 2 is a block diagram of an electric motor control device to which an embodiment is applied.

FIG. 2 is a block diagram of an electric motor control device to which an embodiment is applied.

Referring to FIG. 2, an electric motor control device 100 according to an embodiment includes an inverter 110, a current sensor 120, a sensing unit 130, and a control unit 140.

The control unit 140 is connected to a torque sensor (not shown), receives an electrical signal from the torque sensor to check a generated torque and calculates a control current according to the generated torque to control the inverter 110 so that a supply current corresponding to the control current is supplied to an electric motor M by the inverter 110.

The control unit 140 according to an embodiment may store an algorithm that compensates in real time for the DC offsets of an a-phase current sensor 121 and a b-phase current sensor 122 that are attached to a wiring between the inverter 110 and the electric motor M.

Also, while the current control of the electric motor M is not performed, the control unit 140 may use each current sensor 120 to measure an a-phase current value and a b-phase current value, calculate and store the DC offset of each phase based on the current value of each phase, and then update an offset when the current control of the electric motor M is performed. The offset is a voltage obtained by subtracting a reference voltage from a voltage that is obtained by multiplying the current value of each phase by the equivalent resistance of the current sensor of each phase.

In particular, the control unit 140 according to an embodiment may include a memory for storing a reference offset value, a measured offset value and an updated offset value. The memory (not shown) may be integrated into or separated from the control unit 140.

The inverter 110 is a power supply device that changes a direct current to an alternating current to supply power to the electric motor M. It is possible to supply a current to the electric motor M based on the control of the control unit 140. That is, when a control current is received from the control unit 140, the inverter 110 switches a switching element according to a control current to change a current supplied to the electric motor M to control the operation of the electric motor M.

The current sensor 120 may be attached to at least two of wirings of the inverter. The current sensor 120 according to an embodiment includes the a-phase current sensor 121 and the b-phase current sensor 122, for example. The current sensor 120 may sense the current value of each phase.

The sensing unit 130 may sense sensing current values obtained from at least two of a to c phases and output them to the control unit 140.

Figure 1:
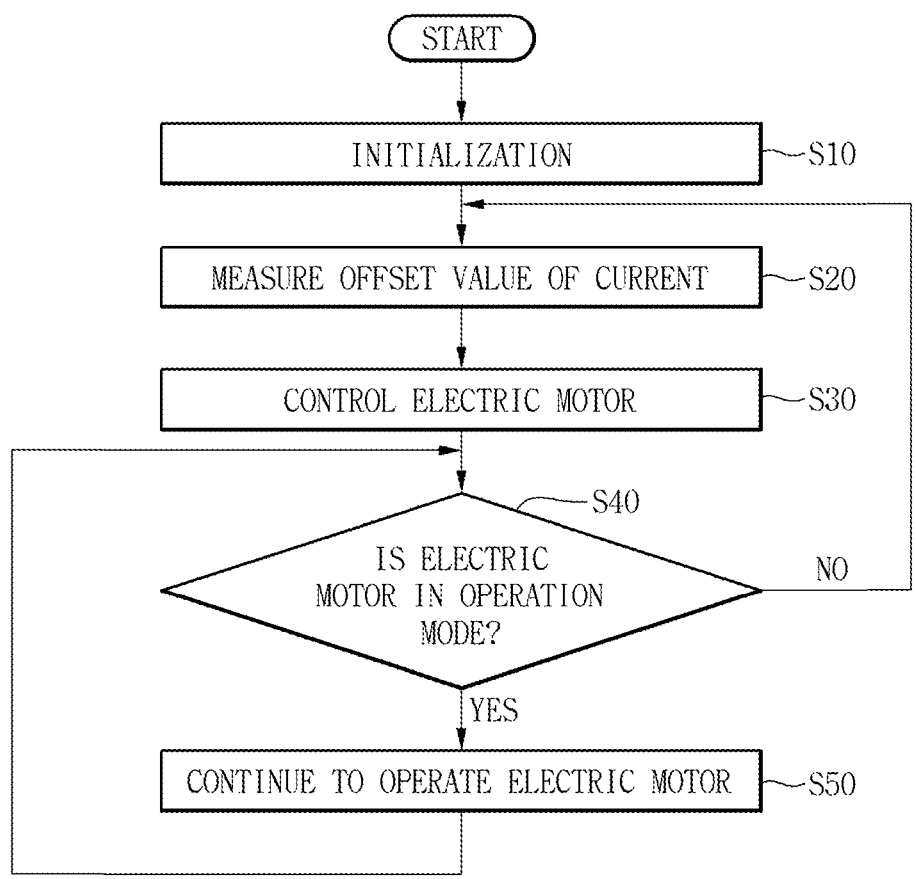
FIG. 1 is an operation flowchart of a typical electric motor control device.

In the following, the operation of the electric motor control device is described in detail based on the configuration of FIG. 1.

Figure 3:
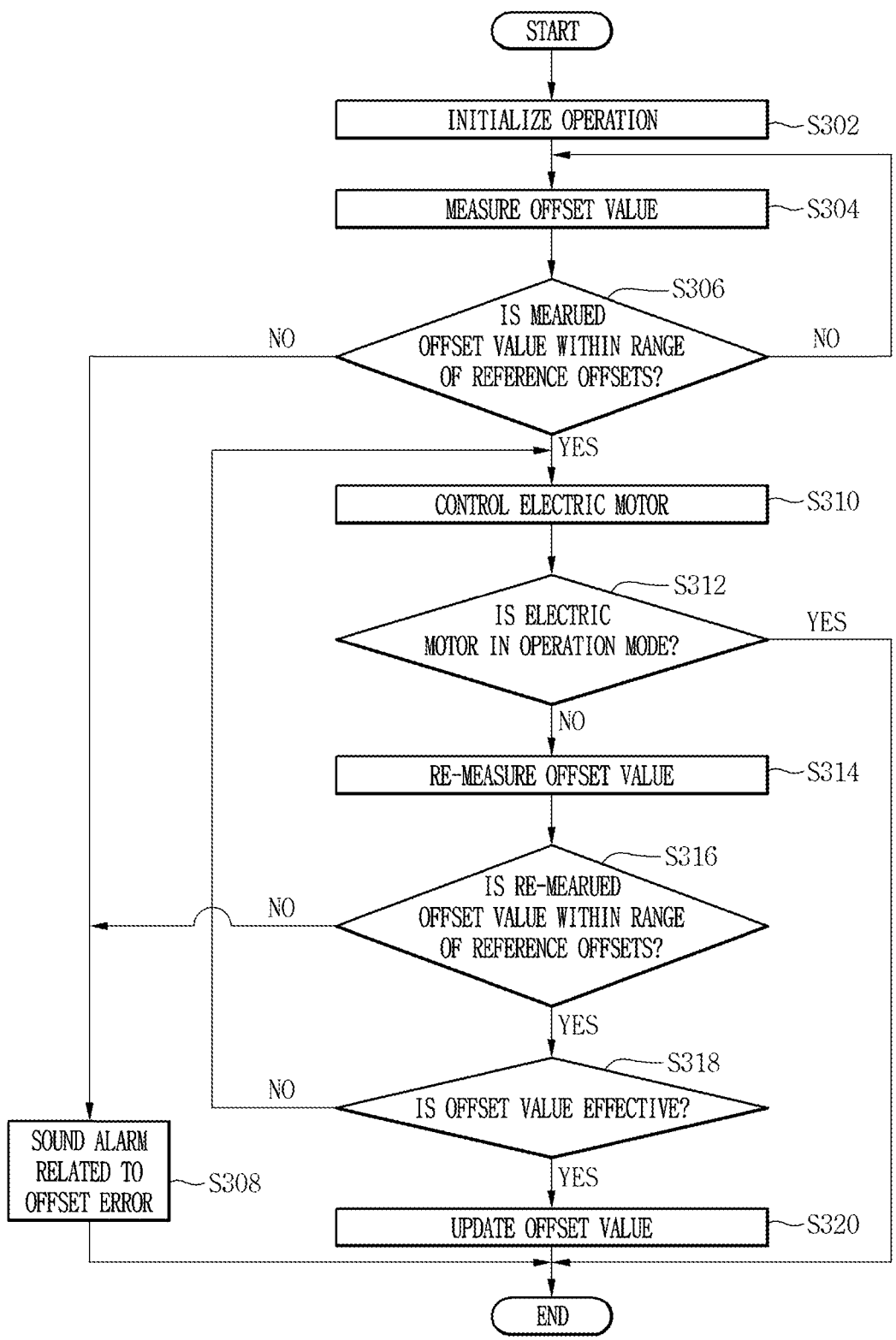
FIG. 3 is a flowchart of an operation of controlling an electric motor according to an embodiment.

FIG. 3 is a flowchart of an operation of controlling an electric motor according to an embodiment.

Referring to FIG. 3, the control unit 140 of the electric motor control device 100 according to an embodiment may perform an initialization operation mode for operating the electric motor in step S302. The initialization operation mode may be an initialization state for operating the electric motor or a previous state.

In this case, the sensing unit 130 may obtain offset values from the a-phase current sensor 121 and the b-phase current sensor 122 without performing the current control of the electric motor M in order to measure the current value of each phase based on the control of the control unit 140.

That is, a current value sensed in a stop state in which the electric motor M does not operate is 'zero', in which case a current sensed at the current sensors 121 and 122 may be an offset value.

The control unit 140 may determine whether a measured offset value (a first offset value) is within a range of normal offset values (hereinafter, referred to as reference offset values) in step S306. That is, the control unit 140 may fix (a range of) reference offset values for the measured offset value and consider as an offset error when the measured offset value is not within the range of reference offset values in step S308. When the measured offset value is within the range of reference offset values, the control unit 140 may compensate for the measured offset value and perform control of the electric motor that controls a current applied to the electric motor M in step S310.

The measured offset value may be stored in the memory (not shown).

The control unit 140 may consistently check (wait for) the operation state of the electric motor during the operation of the electric motor M and determine whether the electric motor M is in a stop state (a non-operation mode) in step S312.

The control unit 140 may re-measure an offset value when the electric motor M is in the non-operation mode in step S314. The control unit 140 re-measures the offset while the electric motor m is in the non-operation mode, namely, while an applied current is zero.

The control unit 140 may determine whether a re-measured current value, namely, an offset value (a second offset value) is within a preset range of reference offset values in step S316.

When the re-measured offset value is within the range of reference offset values, the control unit 140 may compare it with a previously measured offset value (the current offset value) based on Equation 1 below:

$$|Sn - Sc| \geq V$$  <Equation 1> where Sn is the re-measured offset value, Sc is the previously measured offset value (the current offset value), and V is a reference value of the effectiveness of an offset value.

The control unit 140 may calculate a difference between the re-measured offset value Sn and the current offset value Sc and determine whether a calculation result is equal to or greater than the reference value of the effectiveness of the offset value in step S316. That is, the control unit 140 may determine that the re-measured offset value Sn is not effective when the re-measured offset value Sn and the current offset value Sc are not within a range of the reference value of the effectiveness. In this case, the current offset value Sc is not updated to the re-measured offset value.

The control unit 140 may use the current offset value Sc for the control of the electric motor, re-measure offset values a certain number of times and determine the effectiveness when the electric motor is in the non-operation mode. In this case, when it is confirmed a certain number of times or more that the offset values are not effective, it is possible to stop the control of the electric motor (turn off the electric motor) and sound the alarm related to an offset value error.

On the contrary, when the re-measured offset value Sn and the current offset value Sc are within a range of reference values V of effectiveness, it is possible to update the current offset value to the re-measured offset value Sn and compensate for a current needed for the control of the electric motor in step S320.

The above descriptions are only examples of the technical spirit of the present invention, so a person skilled in the art may implement various modifications and variations without departing from the spirit and scope of the present invention.

Thus, embodiments disclosed herein are intended not to limit but to describe the technical spirit of the present invention and the scope of the technical spirit of the present invention is not limited to such embodiments.

The scope of the present invention is defined by the appended claims, and all technical spirits within the equivalent scope are construed as being included in the scope of the right of the present invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A device for controlling an electric motor, the device comprising:
   an inverter supplying a current;
   a current sensor sensing current supplied from the inverter; and
   a control unit enabling the current to be supplied from the inverter to the electric motor,
   obtaining first and second offset values sensed by the current sensor at a plurality of times, comparing the first and second offset values, and updating the first offset value to the second offset value according to a result of the comparison,
   wherein the control unit obtains the first offset value, determines whether the first offset value is within a range of reference offset values and controls the electric motor based on the first offset value when the first offset value is within the range of reference offset values,
   wherein the control unit obtains the second offset value, determines whether the second offset value is within the range of reference offset values, compares the first offset value with the second offset value when the second offset value is within the range of reference offset values, updates the first offset value to the second offset value when a difference between the first offset value and the second offset value is less than a reference value of effectiveness and controls the electric motor based on the first offset value when the first offset value is within the range of reference offset values, and
   wherein the first and second offset values are obtained in a state of non-performance of current control of the electric motor during operation of the electric motor.

2. The device according to claim 1, wherein each of the first and second offset values is measured every non-operation mode in which the electric motor does not operate.

3. The device according to claim 1, wherein the control unit further sounds an alarm related to an offset error when the second offset value exceeds the range of reference offset values.

4. The device according to claim 1, wherein the control unit further compensates for a current value applied to the electric motor based on the updated first offset value.

5. The device according to claim 1, wherein the control unit further re-measures the second offset value multiple times without updating the first offset value when the difference between the first offset value and the second offset value is equal to or greater than the reference value of effectiveness.

6. The device according to claim 5, wherein:
   the control unit further considers the re-measured offset value as the second offset value; and
   the control unit further turns off the electric motor and sounds an alarm related to an offset error when a difference between the re-measured second offset value and the first offset value is equal to or greater than the reference value of effectiveness.

7. The device according to claim 1, further comprising a memory that stores the first and second offset values.

8. The device according to claim 1, further comprising a sensing unit sensing an output value from the current sensor and providing the output value from the current sensor to the control unit.

9. The device according to claim 8, wherein the sensing unit further senses a current value obtained from at least two of three phases of current supplied from the inverter to the electric motor.

10. The device according to claim 1, wherein the control unit is connected to a torque sensor of an electronic power steering apparatus (EPS).

* * * * *